US005812138A

United States Patent [19]
Devic

[11] Patent Number: 5,812,138
[45] Date of Patent: Sep. 22, 1998

[54] METHOD AND APPARATUS FOR DYNAMIC OBJECT INDENTIFICATION AFTER Z-COLLISION

[75] Inventor: Goran Devic, Austin, Tex.

[73] Assignee: Cirrus Logic, Inc., Fremont, Calif.

[21] Appl. No.: 574,889

[22] Filed: Dec. 19, 1995

[51] Int. Cl.$^6$ .................................................... G06T 15/40
[52] U.S. Cl. ......................... 345/422; 345/419; 345/421; 345/523
[58] Field of Search .................................... 399/122, 121; 345/421, 422, 419, 428, 435, 523–525

[56] References Cited

U.S. PATENT DOCUMENTS

| | | | |
|---|---|---|---|
| 4,609,907 | 9/1986 | Shen | 345/421 |
| 4,951,232 | 8/1990 | Hannah | 395/122 |
| 5,005,117 | 4/1991 | Ikumi | 395/122 |
| 5,038,297 | 8/1991 | Hannah | 395/122 |
| 5,101,365 | 3/1992 | Westberg et al. | 345/344 |
| 5,157,388 | 10/1992 | Kohn | 345/136 |
| 5,265,199 | 11/1993 | Catlin | 395/122 |
| 5,268,995 | 12/1993 | Diefendorff et al. | 395/122 |
| 5,301,263 | 4/1994 | Dowdell | 395/122 |
| 5,329,613 | 7/1994 | Brase et al. | 395/122 |
| 5,440,682 | 8/1995 | Deering | 345/503 |
| 5,487,172 | 1/1996 | Hyatt | 395/800 |
| 5,561,750 | 10/1996 | Lentz | 395/122 |
| 5,613,050 | 3/1997 | Hochmuth et al. | 345/422 |
| 5,706,034 | 1/1998 | Katsura et al. | 345/508 |

OTHER PUBLICATIONS

Cohen, Debra, "The 1860 as a Graphics Controller", Dr. Dobb's Journal, v17, n7, p64(6), Jul, 1992.

*Primary Examiner*—Rudolph J. Buchel, Jr.
*Attorney, Agent, or Firm*—James J. Murphy; Steven A. Shaw; Barry S. Newberger

[57] ABSTRACT

A computer graphics display system and method are described for rendering objects formed of at least one geometric primitive as pixel images which collide or intersect in three dimensional space. A depth buffer stores depth information representing graphics images rendered by the graphics system. Data stored in the depth buffer representing graphics objects displayed in the three dimensional space are partitioned into three portions comprising an identification portion to store information identifying each object rendered in the three dimensional space, an object resolution portion to store data for controlling the resolution of the graphics object on a display screen, and a depth coordinate portion for storing the coordination information of the object rendered in the three dimensional space. A collision detection is provided to detect and determine when two objects collide on the display screen. Z depth information stored in the collision detection unit is compared with current Z values in the graphics engine to display a new object. If the Z values of the two objects are the same, the object are considered to have collided in the three dimensional space. The present invention also provides a collision information storage unit to store the coordinate information of object which collide. The collision information may then be used by the computer user in later graphics operations to ensure collision of object rendered in three dimensional space if such collision is desired.

20 Claims, 2 Drawing Sheets

METHOD AND APPARATUS FOR DYNAMIC OBJECT INDENTIFICATION AFTER Z-COLLISION

BACKGROUND OF THE INVENTION

1. Field of the Invention

The present invention relates to computer graphics systems, and, more specifically to an apparatus and a method to identify and detect object collision in a three dimensional space in a graphics subsystem.

2. Description of Related Art

In a computer system with graphics capabilities, a graphics controller executing graphics applications outputs signals representing matter to be displayed on a display screen in the computer system. Such signals may be in two or three dimensional format on the display screen. The representation may also be in abstract and concise form which may require transformation of relatively abstract representation into a form which may be used to control the display. Such transformation may be referred to as graphics rendering in a system using a raster display monitor. Signals specifying a graphics representation may be stored in a frame buffer which may include storage units for storing information representing X and Y coordinates of a 2D graphics display.

The advent of various graphics tools, applications, particularly in a 3D graphics environment, and substantial hardware improvements combined with standardized graphics languages has allowed the use of complex graphics functions even in many common applications. For example, word processors, spread sheets, desktop publishing, and computer games may take advantage of improved graphics capabilities to improve their user interface.

Although 2D graphics display capabilities have been available to computer users, 3D graphics capabilities are now being made available to computer users in the form of games, animation, and drawing packages designed for personal computers. Graphics systems may be required to perform more sophisticated functions in less amount of time in order to process greater amounts of graphical data required by modern software applications.

In many conventional graphics systems, pixel information on a graphics screen may be referenced using X and Y locations in the same manner points in a graph are referenced. Since a graphics screen is two dimensional, only X and Y dimensions may be needed.

However, with the introduction of more sophisticated graphics applications and games, many applications are progressing from rendering graphics primitives, such as lines and polygons of objects to rendering shaded images of surfaces of objects. Such object rendering requires a display of depth of such objects with respect to the viewer's position.

Since depth dimension in a three dimensional coordinate system is typically called the Z-dimension, depth information for both hidden and shaded third dimensional surface of objects is kept in an area called a Z-buffer. The Z-buffer contains data representing the depth of each pixel relative to the surface of the display screen, and therefore away from the position of the viewer. Thus, when a pixel is to be displayed, its depth location may be compared with the depth of a pixel already being displayed on the screen to determine whether a pixel will be displayed or hidden by another pixel.

Prior art software and hardware implementations of Z-buffers dedicate an amount of memory, which may be located in computer main memory or within a dedicated graphics display device memory, to store depth dimension for each pixel in a set of pixels being displayed. For each pixel in a set, the Z coordinate stored in the Z-buffer may be defined to be 'n' bits wide thus having a range of $(0, 2^n-1)$ bits in magnitude. The width 'n' is a constant throughout the Z buffer and may get larger with each new rendering engine. The average width of the Z buffer in many prior art rendering engines is about 16 bits, although the widths have increased in size (e.g., 24–32 bits) as memories continue to become smaller and cheaper.

Prior art hardware rendering engines render graphics primitives by linearly interpolating data values for each dimension X, Y, and Z and using the result of the first two interpolations to define a point in a two dimensional space which is identity-mapped to the Z buffer array in which the rendering engine stores the result of a third interpolation.

FIG. 1 is shows a diagram illustrating an example of object collision and intersection in 3D space in a prior art graphics system. The example illustrated in FIG. 1 includes a triangle A, a sphere B, and a box C colliding and obscuring each other. Triangles D and E are shown intersecting with each other.

In the example illustrated in FIG. 1, the Z values of triangle A and sphere B may be the same thereby causing the two objects to collide in 3D space. Similarly, the Z values for triangle A and box C may also be the same causing the two objects to collide in 3D space.

During the graphics rendering process, a graphics processor interpolates the values of the current primitives. The values interpolated will be the current X, Y, and Z coordinates in 3D space. For each pixel drawn, the graphics processor fetches a Z value from the Z buffer which corresponds to a present coordinate. The newly interpolated Z value is then compared with old Z values stored in the Z buffer to determine whether the two objects collide. If the two values are the same, the point to be drawn is determined to have collided with a similar point residing at that particular portion of the screen with the same coordinates.

Objects drawn in 3D space may collide or intersect depending on the Z values of the objects as stored in the Z buffer. Such collision and intersection of the Z values of objects may cause objects to exhibit artifacts which sometimes make it difficult for a viewer to discern the edges of objects displayed.

The object collision described in FIG. 1 further makes its difficult, for example, for computer games users to detect when an object collides in X,Y, Z space on a display screen. The prior art collision mechanism further makes it difficult to replicate, duplicate, or isolate collision and intersection points in 3D space on a graphics screen for subsequent graphics operations.

One solution to the Z buffer intersection problem is to pull the edge of the object being displayed Z buffer value forwards toward the user by arbitrarily changing the Z buffer values for the edges.

Another conventional solution to object collision is to resort to ray-tracing by utilizing computationally expensive mathematical calculations of geometrical intersections of objects rendered. Such calculations tend to be time consuming and tie up a CPU. The intersection of a ray to each graphics object is found by calculating possible intersections to each graphics primitive which make up each object.

With the increasing use in the number of graphics applications and computer games, a need therefore exists in the art for a method for rendering objects to the graphics screen in a manner which enables detection of collision and intersection of such objects depending on Z-values of such objects.

SUMMARY OF THE INVENTION

The principles of the present invention are embodied in a novel graphics processor architecture which provides for detecting and ensuring collision of objects rendered in three dimensional space on a graphics display screen. The present invention enables a graphics rendering system, which includes a collision detection unit, during interpolation of new values representing the depth or Z information of an object to be written to a storage unit which stores the depth or Z information for comparison with older values of Z information already rendered to a display screen.

The collision detection unit of the present invention includes a Z information storage unit for storing Z values of objects being rendered, a Z interpolation unit for interpolating new Z values of objects to be rendered to the display screen. The present invention further includes a collision comparator unit for receiving stored Z value information in the Z storage unit and new Z values from the interpolation unit. The comparator unit then compares the two values to determine whether the new Z value of an object to be displayed may be written to the Z storage unit.

A collision flag unit is included in the collision detection unit of the present invention to store enabling Z collision bit information which may be dynamically configured by the system user to determine whether one or several graphics primitives may be determined. Z collision bit information may thus be checked by the graphics rendering system to determine if a collision has occurred. Collision enabling information may be reset to flush the contents of the collision flag unit to initiate detection of object collision by the collision unit.

In one embodiment of the present invention, the Z storage unit may be set to be about at least approximately 16 bits or 32 bits wide to store Z values of objects on the display screen. The Z storage unit may be dynamically set by the user to a desired width to store Z information of an object to be displayed. Data stored in the Z storage unit may be partitioned into three distinct fields. These fields include an object identification field which may store object identification information for object identification by the graphics processor. Thus, each 3D object held in the Z storage unit may be assigned a unique number so that when the object is rendered, the object identification number may be held constant throughout Z interpolation for each graphics primitive which belongs to that object.

Furthermore, the object identification field may be masked out before the rest of Z information is presented to the comparator unit. If a collision is detected, the original Z value from the Z storage unit may be saved and the upper bits representing the object identification number may eventually be examined to determine the identification of the object which collided during the last rendering. If a collision is not detected, Z collision enabling information is flushed and the Z value of an object being displayed is not used.

A third portion of Z data stores information which may be masked out to enable lowering the resolution of the Z buffer values before these values are presented to the collision comparator unit. The resolution decrease may be required as two linearly Z interpolated values may not have an intersection point represented in a set of available integers. When an object is rendered, its Z value is interpolated and compared to the previous Z value at a particular point on a display screen to decide if the Z buffer (and the pixel in general) may need to be updated.

Another embodiment of the graphics rendering system of the present invention may therefore include an updating circuit for updating Z values of objects stored in the Z storage unit. When an object is rendered, its Z value is interpolated and compared with a previous Z value at that point to decide if the Z storage unit needs to be updated in the update circuit.

Advantages of the present invention include enabling a system user to expand the use of the Z storage unit beyond prior art usage for merely storing the third dimension information of an object being rendered. The Z storage unit of the present invention allows a user to use the Z storage unit for determining an object identity and a lower resolution to ensure collision detection. The present invention also allows a user to dynamically program the Z storage unit to set width data stored therein.

The collision detection method of the present invention has the advantage of allowing the user to identify, replicate, duplicate, and isolate collision points of objects in three dimensional space for subsequent use.

The foregoing and other features, aspects and advantages of the present invention will become more apparent from the following detailed description of the present invention when taken in conjunction with the accompanying drawings.

DETAILED DESCRIPTION OF THE PREFERRED EMBODIMENT

FIGS. 2 through 6 of the drawings disclose various embodiments of the present invention for purposes of illustration only. One skilled in the art will readily recognize from the following discussion that alternative embodiments of the structures and methods illustrated herein may be employed without departing from the principles of the invention.

Figure 1:
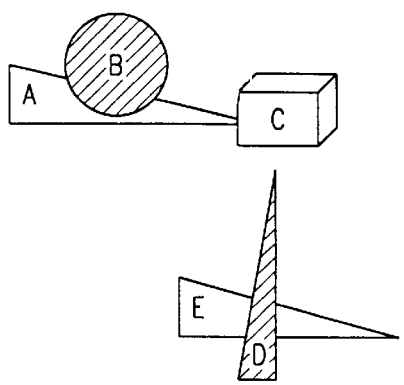
FIG. 1 is a simplified diagram illustrating the collision and intersection of objects including triangles, a sphere, and a box in 3D space in the prior art.
Figure 2:
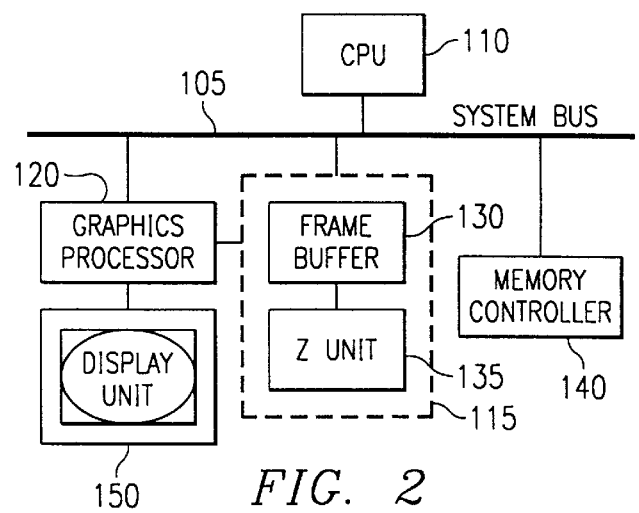
FIG. 2 is a simplified block diagram of a computer system including a graphics subsystem which comprise a Z-unit incorporating the teachings of the present invention.

Referring FIG. 2, a simplified block diagram is shown of a computer system incorporating the present invention. Referring to FIG. 2, computer system 100 includes a central processing unit (CPU) 110, graphics processor 120, frame buffer 130, Z-unit 135, memory controller 140, and display unit 150.

CPU 110 communicates to other components of computer system 100 via system bus 105. Graphics processor 120 couples to system bus 105 to process graphics data stored in frame buffer 130. Graphics processor 120 provides graphics imagery output to display unit 150 which is displayed to a user of computer system 100.

Frame buffer 130 and Z-unit 135 store X,Y, and Z data representing X,Y, and Z coordinates of pixels displayed on display unit 150. In one embodiment of the present invention, frame buffer 130 and Z-unit 135 may be integrated in a single integrated circuit 115.

Figure 3:
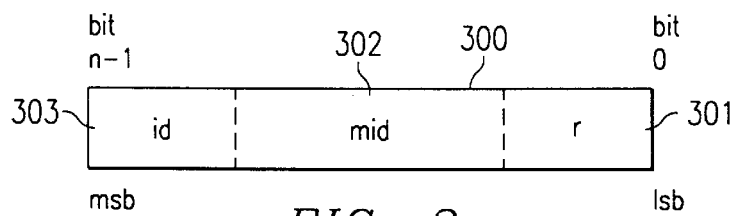
FIG. 3 is a simplified diagram illustrating the partitioning of a word representing the Z-value of an object being rendered in 3D space of one embodiment of the present invention.

FIG. 3 is a simplified diagram illustrating bit field partitioning of every word of data stored in Z-unit 135 of one embodiment of the present invention. As illustrated in FIG. 3, buffer word 300 is partitioned into three distinct data locations. Partition (r) 301 stores the least significant bits of data in buffer word 300. Partition (id) 303 stores the most significant bits of buffer word 300. Partitions 301 and 303 may represent a contiguous subset of bits such that [id]+[r] <[n], and 0 is an element of r and (n−1) is an element of id. Partition 302 stores the rest of the bits representing buffer word 300.

Partition 303 may also store data used for object identity numbers. Every pixel of each 3D object stored in Z-unit 135 may be assigned a unique number in the range of [0, 2^id−1]. When rendered, the substring stored in partition 303 may be held invariant throughout Z interpolation for each graphics primitive which belongs to an object being rendered. Thus, every Z value stored in Z-unit 135 may have a tag which may be used to identify the pixel being displayed rather than to store part of the Z value of the pixel.

In the present invention, partition 303 may be masked out before a collision comparison is performed in Z unit 135. If a collision is detected, the original value of an object being displayed is saved and its [id] may be later examined to bring the identity of an object which collided during a previous rendering. Furthermore, the width of the Z buffer of the present invention may be set to 32 bits. The widths of 'id' and 'r' fields may be pre-set and kept in a register of the graphics rendering engine to allow a user to dynamically configure the desired setting.

Figure 4:
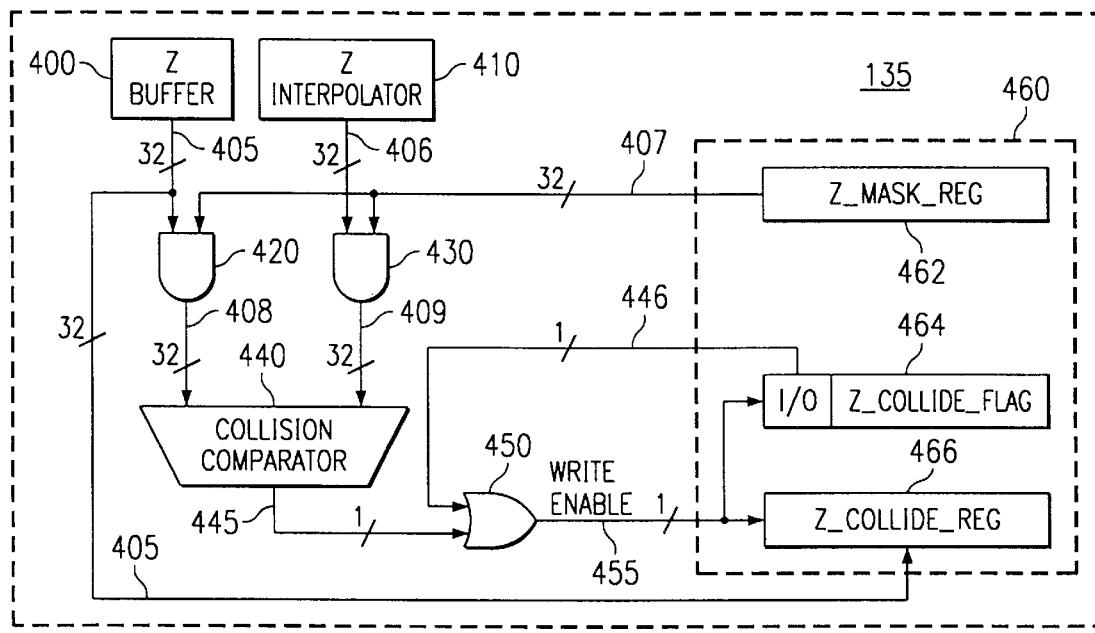
FIG. 4 is a simplified block diagram of the internal circuitry of the Z-unit including a Z-buffer, a Z-interpolator, a collision comparator unit, and a register file of one embodiment of the present invention.

FIG. 4 is a simplified block diagram illustrating one embodiment of the collision circuit of the present invention. Circuit 135 includes Z buffer 400, Z interpolator 410, AND logic circuits 420 and 430, collision comparator unit 440, OR logic circuit 450, and register file 460 including Z_MASK_REG 462, Z_COLLIDE_FLAG 464, and Z_COLLIDE_REG 466.

Z buffer 400 couples to AND logic circuit 420 via output lines 405 to render Z values of objects being rendered to collision comparator unit 440. In the preferred embodiment of the present invention, Z buffer 400 is set programmable and may be set to be 16 bits wide. Z buffer 400 also couples to Z_COLLIDE_REG 466 via output lines 405 to store Z values of objects rendered by graphics processor 130.

Z interpolator 410 is coupled to AND logic circuit 430 via output lines 406 to linearly interpolate new Z values of objects rendered by graphics processor 130 to display unit 150. Z interpolator 410 may be part of the graphics engine of graphics processor 120.

AND logic circuit 420 receives as inputs data lines 405 and 407 from Z-buffer 400 and Z_MASK_REG 462 respectively. Data lines 405 represent the Z-values of object being rendered to display unit 150 and data lines 407 represent a mask value of the Z data stored in Z buffer 400. AND logic circuit 420 logically ANDs data lines 405 and 407 to generate output lines 408 to collide comparator unit 440.

AND logic circuit 430 receives as inputs data lines 406 and 407 from Z interpolator 410 and Z_MASK_REG 462 respectively. Data lines 406 represent Z interpolated values of objects being rendered by collision circuit 135. The ANDed values of data lines 406 and 407 are driven out output lines 409 by AND logic circuit to collision comparator unit 440.

Collision comparator unit 440 receives as inputs data lines 408 and 409 from logic circuits 420 and 430 respectively. Data lines 408 and 409 represent the Z value of a pixel and the newly interpolated Z value of an object being rendered respectively. Collision comparator unit 440 generates a bit value to set collision flag in Z_COLLIDE_FLAG 464 via OR logic circuit 450 if the Z value and the mask value of an object being rendered are equal.

OR logic circuit 450 receives as inputs data lines 445 and 446 from collision comparator unit 440 and Z_COLLIDE_FLAG 464 respectively. Data line 445 is set to a '1' by collision comparator unit 440 if the Z value and mask value of an object matches. OR logic circuit 450 asserts a write enable signal 455 to Z_COLLIDE_FLAG 464 and Z_COLLIDE_REG 466 to enable the collision flag and the collision value to be written to storage units 464 and 466 respectively.

During rendering, if the Z values after masking are equal, collision comparator unit 440 may set a flag bit in Z_COLLIDE_FLAG 464 to a binary '1'. Only one bit in Z_COLLIDE 464 may be used. Rendering software may reset Z_COLLIDE_FLAG 464 to a binary '0' before rendering one or several graphics primitives and check if a collision has occurred by examining that bit. Also, collision comparator unit 440 may enable writing of the original Z value from Z-buffer 400 to Z_COLLISION_REG 466, such that rendering software may read it and isolate an object identity number from the top three bits of Z_COLLIDE_REG 466.

In the preferred embodiment of the present invention, when an object is being rendered, its Z value is interpolated and compared to a previous Z value of a pixel rendered to determine if Z buffer 400 and the appropriate X,Y plane value needs to be overwritten with a newly interpolated value from Z interpolator 410. The values written to collision comparator unit 440 have the 'id' partition masked out in Z_MASK_REG 462 since those bits are not part of a displayed pixel's real Z coordinate anymore, but may hold an identity number.

The partition r of a Z-buffer word, being masked out from Z data values, may be used for lowering the resolution of a Z buffer value before going to collision comparator unit 440. Collision comparator unit 440 compares a Z interpolated value to an existing Z buffer value and signals collision if and only if they are equal. This resolution decrease is needed because two linearly Z interpolated values may not have an intersection point represented in the set of integer numbers. However, with [r]=1 (the least significant bit (lsb) is masked out before comparison), collision is detected easily since Z values may be floored into even numbers.

Figure 5:
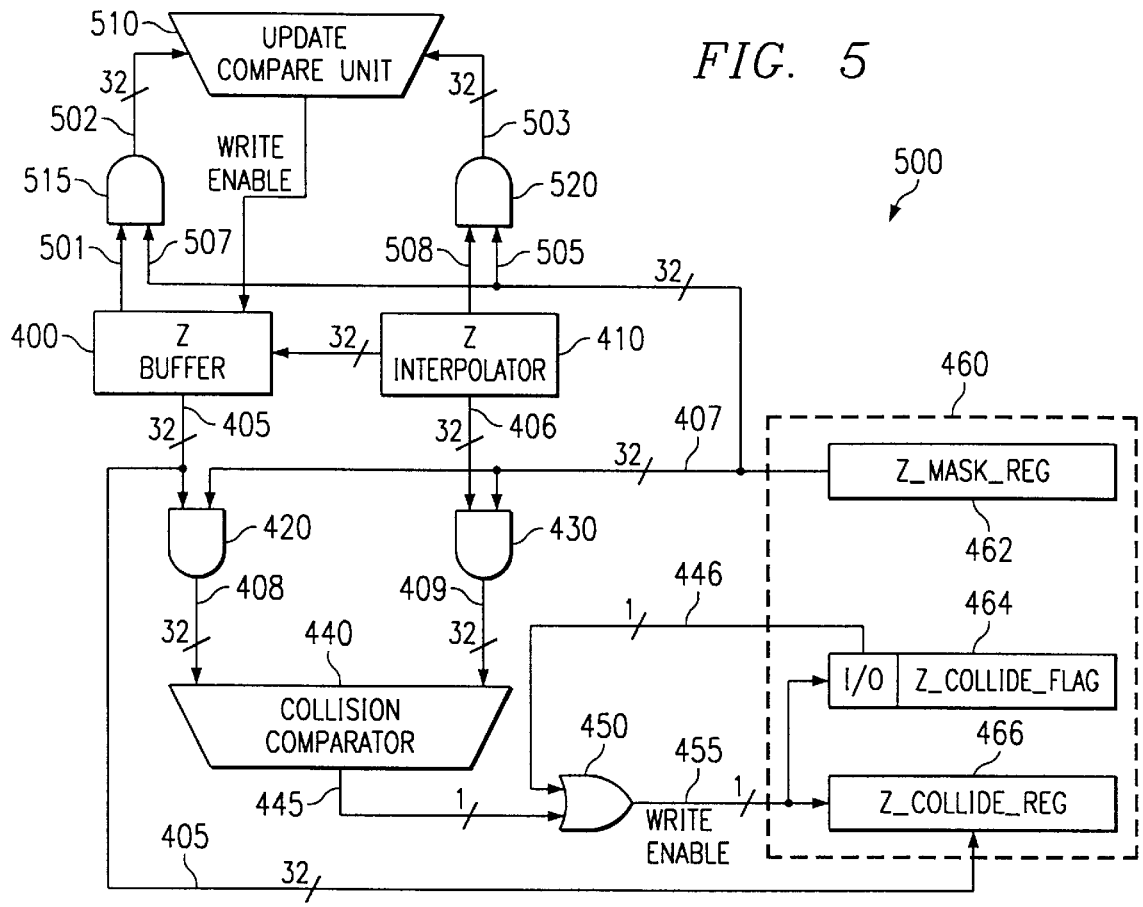
FIG. 5 is a simplified block diagram of the internal circuitry of the Z-unit including an update circuit for updating Z-value information in the Z-unit of one embodiment of the present invention.

FIG. 5 is a simplified block diagram of the Z value update circuit of one embodiment of the present invention. Update circuit 500 includes a collision detection circuit as described in FIG. 4, an update comparator unit 510, and AND logic circuits 515 and 520.

During interpolation, new Z values may have to be written to Z buffer 400 if a newly interpolated point is closer in the Z plane than an old one may have been. Usually, a lower Z value is considered as closer and a higher Z value is considered to be further to allow update comparator unit 510 to activate write enable signal 504 when needed.

AND logic circuit 515 is coupled to Z buffer 400 and Z_MASK_REG 462 via input lines 501 and 508 respectively. AND logic circuit 515 generates a 16 bit output via output lines 502 to update comparator unit 510 to update the contents of Z buffer 400.

AND logic circuit 520 is coupled to Z interpolator 410 and Z_MASK_REG 462 via input lines 505 and 508 to update new Z values to be interpolated to a display screen. AND logic circuit generates a 16 bit output to update comparator unit 510 via output lines 503.

Update comparator unit 510 receives an old Z value of an object rendered from Z buffer 400 via input line 502 and a newly interpolated point from Z interpolator 410 via input line 503. The newly interpolated Z value and the already existing Z value are compared to determine if the values are the same. If the values are not the same, update comparator unit 510 writes the new Z value to Z buffer 400.

In the preferred embodiment of the present invention, since Z buffer 400 may be set to be 32 bits wide, a problem arises since the 32 bit Z value does not hold only Z coordinate information, but also an identity number for each pixel. To solve these problems, the id portion may mask out the top 16 bits of the Z value which may be provided by using the top 16 bits of Z_MASK_REG 462. The lower 16 bits of the Z value may be passed to update comparator unit 510 as they may be. The choice of 16 bits is arbitrary and may be equal or larger than the number of bits of the identity portion of the Z value.

Figure 6:
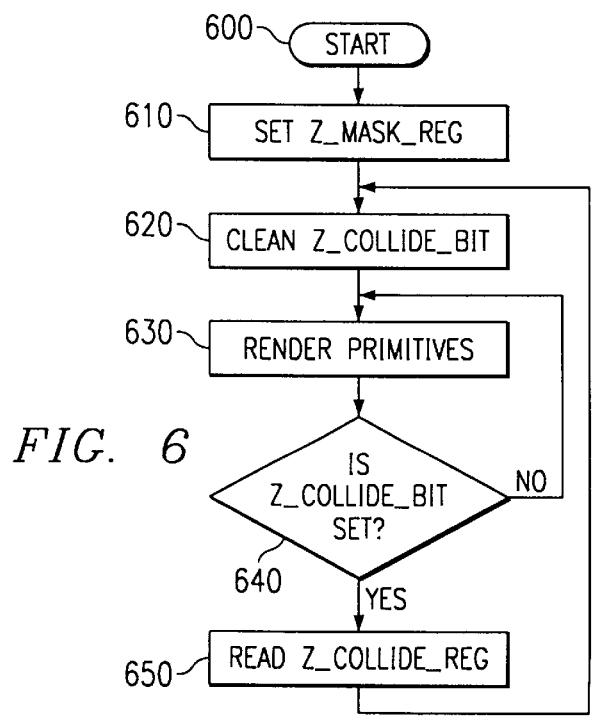
FIG. 6 is a flow diagram illustrating the object collision and intersection detection method of the present invention.

FIG. 6 is a flow diagram illustrating the collision detection method of one embodiment of the present invention. The collision detection method of the present invention may primarily be used to identify objects as they collide or to ensure object collision in 3D space.

Referring to FIG. 6, at box 610 at the beginning of the rendering of an object to a display screen, Z_MASK_REG 462 may be set with all bits equal to a binary '1' except several top bits and several bottom bits. The string of top bits which may be 'Zeros' define the identity portion of a Z value width of an object being rendered.

In the present invention, the number of bits used depend on the number of objects which may have to be distinguished. For example, if up to 64 different values are needed to be distinguished there may be 6 Zeroes (i.e. 2^6=64) or '0000001111'. The length of the string from the bottom bit which may be set to Zero depends on the Z value degradation level and is recommended not to be more than two bits or '. . . 11100'.

At box 620 before each graphical object is rendered, the Z_collide_bit in Z_COLLIDE_FLAG 464 may be reset to Zero in order to enable an object being rendered to be checked for being equal to 1 after the drawing of each graphics primitive.

At box 630, after the Z-collide-bit has been reset, a graphics object is rendered and graphics imagery may then be drawn on a display screen.

At box 640 after a graphics primitive has been rendered, the Z_collide_bit in Z_COLLIDE_FLAG 462 is checked to determine whether the value of the Z_collide_bit is Zero. If Z_collide_flag is zero, then no collision occurred during the last rendering and the next rendering of a primitive may continue. If, on the other hand, the value of Z_collide_bit is set, collision has occurred and appropriate rendering may occur.

At box 650 Z_COLLIDE_REG 466 is read and the top bits which contain an object identity number are extracted. This number identifies the object which existed at a point where a newly rendered primitive may have been drawn. After the newly rendered primitive has been drawn, the object collision method of the present invention continues at box 610 until all objects being rendered are complete.

Thus, a method and apparatus is provided for transferring pixel data information from a data storage unit to a tile based frame buffer without overwriting data already stored in such tiles. From the above description, it will be apparent that the invention disclosed herein provides a novel and advantageous method and apparatus for executing pixel information in a computer system. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. For example, the invention could be used with any microprocessor platform, including Intel's X86, the Power PC™, DEC Alpha™, etc., and could be used with any instruction set. The following claims are indicative of the scope of the invention. All variations which come within the meaning and range of equivalency of the claims are to be embraced within their scope.

What is claimed is:

1. A graphics processor for rendering graphics primitives, said graphics processor including a collision detection circuit for detecting collision coordinates in three dimensional space, said circuit comprising:

(a) a depth information storage unit for storing data representing depth information of the primitives rendered;

(b) a depth information interpolation unit for interpolating depth information of newly rendered primitives;

(c) a depth comparison unit coupled to said depth information storage unit and said depth interpolation unit respectively to receive depth information corresponding to currently rendered primitives and existing primitives;

(d) a depth collision information unit coupled to said depth comparator unit to receive data values of primitives, said depth collision information unit storing and generating collision information of objects displayed; and (e) a depth collision mask information storage unit coupled to said depth comparison unit for holding depth mask information which may be programmed to define depth resolution of objects being displayed in three dimensional space and representing collision points of primitives rendered.

2. The collision detection unit of claim 1 wherein said depth collision information unit includes a depth collision register for storing said collision information of said primitives colliding in said three dimensional space.

3. The detection circuit of claim 1 further including a depth collision flag storage unit coupled to said depth collision information unit to store bit information associated with primitives rendered.

4. The detection circuit of claim 3 wherein said depth collision information storage unit is at least 16 bits wide.

5. The detection circuit of claim 4 wherein said depth collision flag storage unit is dynamically programmable in software.

6. The detection circuit of claim 1 wherein said depth information stored in said depth collision information storage unit is partitioned into three portions.

7. The detection circuit of claim 6 wherein a first of the three portions of collision information stores bit identification information for identifying primitives rendered.

8. The detection circuit of claim 7 wherein a second of the three portions of collision information represents masking information for identifying when primitives collide in said three dimensional space.

9. A graphics processor having a collision detection circuit for detecting and ensuring object collision in three dimensional space, said collision detection circuit comprising:

(a) a Z buffer for storing Z values of objects displayed in three dimensional space;

(b) a Z interpolator for interpolating new Z values of the objects to be rendered in three dimensional space;

(c) a Z update unit coupled to said Z buffer and said Z interpolator for updating Z values in said Z buffer when said Z interpolator interpolates new Z values for the objects rendered in three dimensional space; and (d) a programmable depth mask information register for holding mask information which may be programmed to define depth resolution of objects being displayed in three dimensional space, said programmable depth mask information register being coupled to said Z update unit.

10. The collision detection circuit of claim 9 wherein said update unit includes a plurality of AND logic gates coupled to said Z buffer and said Z interpolator to receive input signals responsive to Z data stored in said Z buffer and said Z interpolator respectively.

11. The collision detection circuit of claim 10 wherein said update unit further includes a comparison logic circuit coupled to said AND logic gates to receive and compare data stored in said Z buffer and said Z interpolator when a new object is being rendered in three dimensional space prior to updating the contents of said Z buffer.

12. The collision detection circuit of claim 9 wherein said update unit includes a write enable signal line which may be asserted to enable said update unit to update said Z buffer.

13. In a computer system having a graphics processor for processing graphics information, said graphics processor including a graphics object collision detection unit for receiving depth information representing a graphics object to detect and ensure collision of the graphics object in three dimensional space, said collision detection unit comprising:

(a) a depth data storage unit for receiving and determining which portions of said depth information may be overwritten in said three dimensional space;

(b) a depth collision flag register coupled to said depth data storage unit to receive collision information, said depth collision flag register being set to indicate whether a collision of objects being rendered in said three dimensional space has occurred;

(c) a depth collision information unit coupled to said depth data storage unit to generate, receive and retain portions of the depth information for subsequent identification and isolation of objects which may have collided in three dimensional space; and (d) a programmable depth mask information register coupled to said depth collision information unit for holding mask information which may be programmed to define depth resolution of objects being displayed in three dimensional space.

14. The improvement of claim 13 wherein said depth storage unit is at least 16 bits wide.

15. The collision detection unit of claim 13 wherein the portions of depth information include an identification portion for identifying objects when rendered in three dimensional space.

16. The collision detection unit of claim 13 further comprising a comparator logic circuit for receiving depth information representing an already rendered graphics object in three dimensional space stored in said depth data storage unit and newly interpolated depth information representing an object to be rendered in three dimensional space to determine whether said graphics objects may collide in three dimensional space.

17. In a graphics processing system having a graphics object collision detection circuit, a method for detecting and ensuring graphics object collision in three dimensional space comprising the steps of:

(a) receiving depth information associated with objects rendered in three dimensional space;

(b) receiving new interpolated depth information associated with objects to be rendered in three dimensional space;

(c) comparing and determining whether existing depth information and newly interpolated depth information are equal;

(d) writing depth information to a collision information storage unit from said step (c) if existing depth and newly interpolated depth information are equal; space (e) partitioning said depth information into three portions, wherein a first of the three portions stores identification information identifying an object rendered in three dimensional space;

(f) masking at least a portion of said depth information by programablly defining mask information to define depth resolution of objects being displayed in three dimensional space.

18. The method of claim 17 further including the step of initializing a depth information mask register in the collision detection unit prior to rendering a new graphics object in three dimensional space.

19. The method of claim 18 further including the step of initializing a depth collision information register by setting bit information contents of the register to binary zeroes prior to rendering new graphics objects to three dimensional space.

20. The method of claim 17 further including the step of checking the depth information register after the new object has been rendered to determine whether the bit information contents have changed after a previous initialization of the contents of the register, and wherein if the register contents have changed, the newly rendered graphics object is considered to have collided with an existing object in three dimensional space.

* * * * *